S. E. BERLINER.
LEAF TURNER.
APPLICATION FILED JUNE 29, 1908.

968,733.

Patented Aug. 30, 1910.
3 SHEETS—SHEET 1.

WITNESSES

INVENTOR

S. E. BERLINER.
LEAF TURNER.
APPLICATION FILED JUNE 29, 1908.

968,733.

Patented Aug. 30, 1910.
3 SHEETS—SHEET 2.

S. E. BERLINER.
LEAF TURNER.
APPLICATION FILED JUNE 29, 1908.
968,733.
Patented Aug. 30, 1910.
3 SHEETS—SHEET 3.
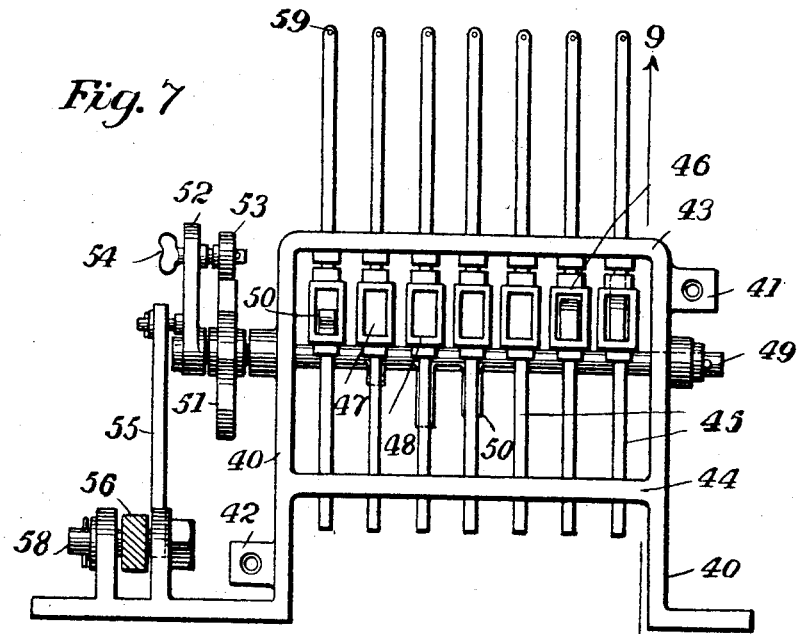
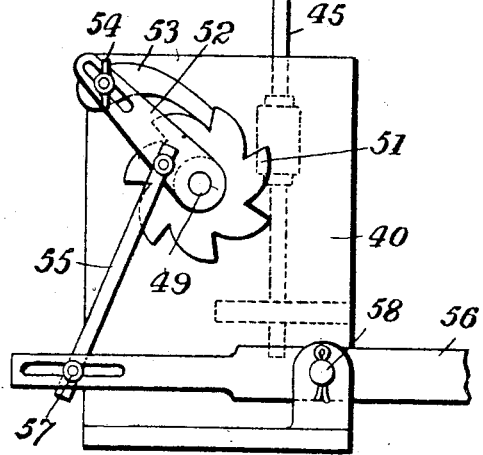
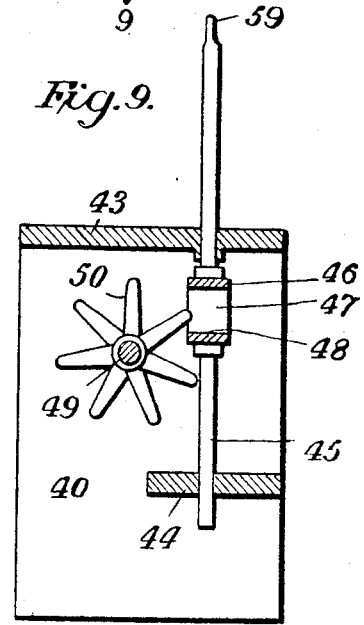
Witnesses
J. H. Bruninga
J. J. McCarthy
Inventor
Selma E. Berliner
By
Foster, Freeman, Watson & Coit
Attorneys

UNITED STATES PATENT OFFICE.

SELMA ELIAS BERLINER, OF SAN ANTONIO, TEXAS.

LEAF-TURNER.

968,733.  Specification of Letters Patent.  Patented Aug. 30, 1910.

Application filed June 29, 1908. Serial No. 441,010.

*To all whom it may concern:*

Be it known that I, SELMA ELIAS BERLINER, a citizen of the United States, residing at San Antonio and State of Texas, have invented a new and useful Leaf-Turner, of which the following is a specification.

This invention relates to leaf turners.

The objects of this invention are to provide a leaf turner which may be placed between the leaves of a book and which may be operated by a treadle or lever to successively turn the leaves; and to provide a construction in which the hands of the operator are entirely free.

The invention broadly stated consists in a spreader which may be held in collapsed position between the leaves of a book. A treadle or lever is provided which is operatively connected with the spreader to open it so as to turn over a leaf.

A plurality of spreaders may be provided. These spreaders are suspended from a support to a position between the leaves. The treadle, which is preferably placed alongside of the usual pedals of a piano, operates a step by step mechanism which is operatively connected to the different spreaders so as to successfully open them and successfully turn over the leaves.

Figure 1:
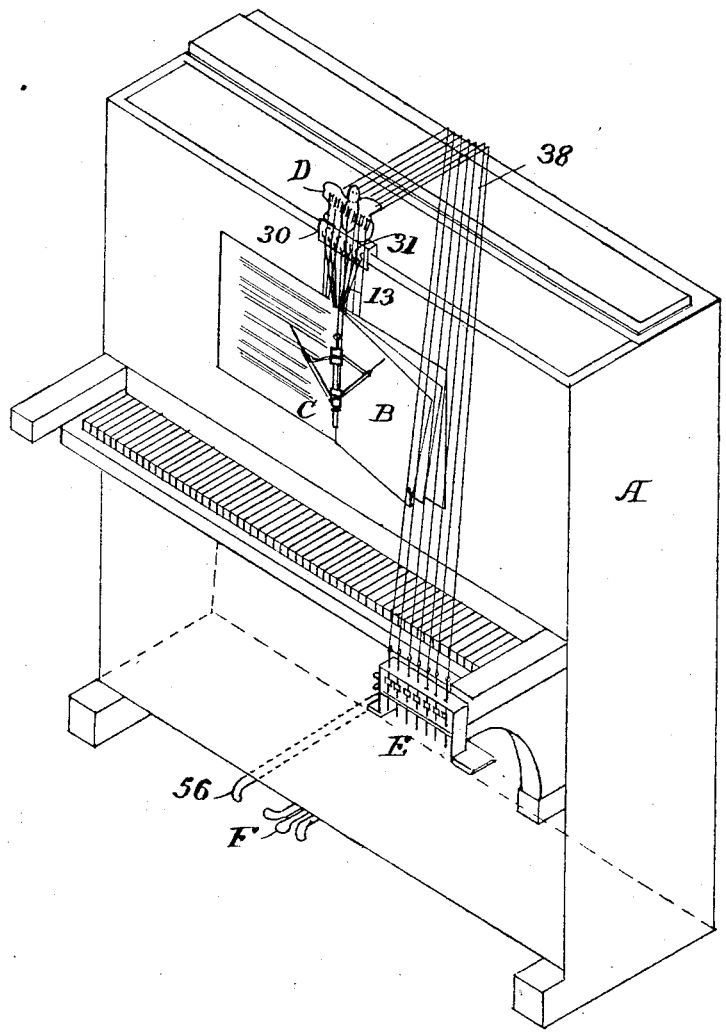
Figure 2:
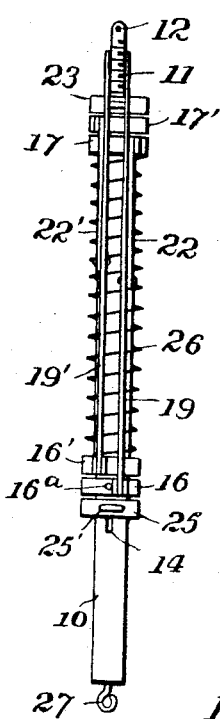
Figure 3:
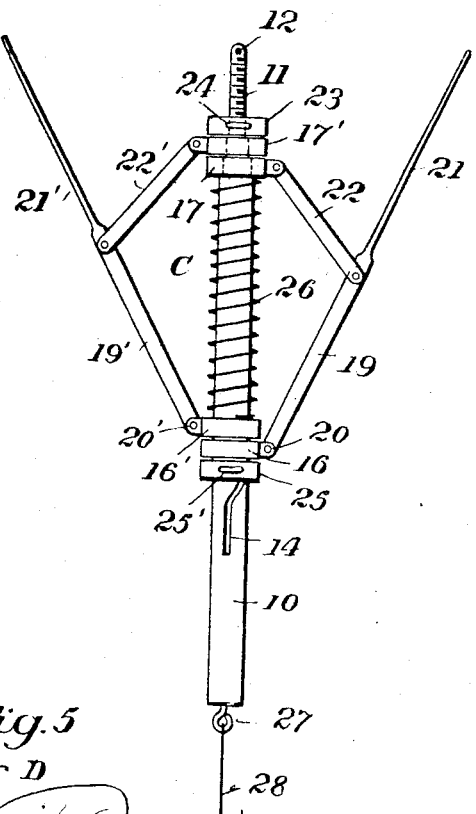
Figure 4:
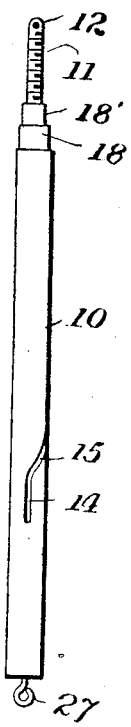
Figure 5:
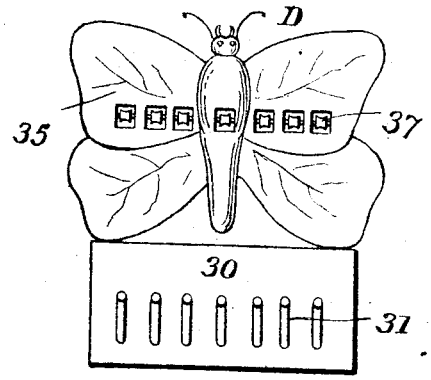
Figure 6:
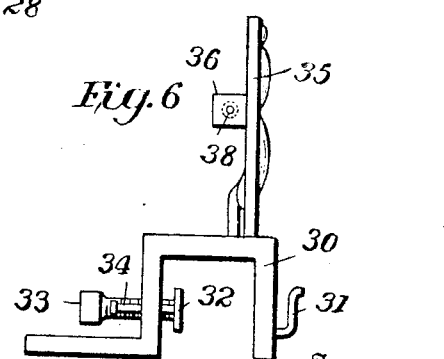

In the drawings: Figure 1 is a perspective view showing the invention applied to a piano; Fig. 2 is a view showing the spreader in collapsed position; Fig. 3 is a view showing the spreader in open position; Fig. 4 is a detail view of the supporting shank; Fig. 5 is a front elevation showing the spreader support and wire guide; Fig. 6 is an end view of the construction shown in Fig. 5; Fig. 7 is a front elevation of the operating mechanism; Fig. 8 is an end elevation of the operating mechanism; and Fig. 9 is a section on the line 9—9 Fig. 7.

In Fig. 1, A represents a piano and B a book placed upon a book support. A spreader C is shown in position between the leaves of the book and is shown in open position. D designates a support and guide which is clamped to the frame of the piano.

Referring to Figs. 2, 3 and 4, 10 designates a supporting shank provided with a threaded portion 11, terminating in an eye 12, which is adapted to receive a wire 13 by means of which the spreader may be suspended from the hooks on the support D.

The shank is provided with a slot consisting of a straight portion 14 and a helical portion 15. The shank is cylindrical in form. A sleeve 16 is slidingly and rotatably mounted upon the shank and provided with a pin 16ª, which enters the slot 14, 15. A second sleeve 17 is rotatably mounted upon the reduced portion 18 of the shank. An arm 19 is pivoted at 20 between ears on the sleeve 16 so as to swing outwardly, and move around the shank with the sleeve. The arm terminates in a reduced or drawn out portion 21. A link 22 connects the sleeve 17 with the arm 19. A second set comprising sleeves 16′, 17′, an arm 19′ pivoted at 20′ and terminating in the reduced or drawn out portion 21′ and connected to the sleeve 17′ by link 22′, is provided, the arm 19′ being symmetrically placed with respect to the arm 19. The sleeve 17′ is rotatably mounted upon the reduced portion 18′. The sleeve 16′ is provided with a pin which enters a groove consisting of straight and helical portions similar to the groove 14, 15, but reversely disposed on the opposite side of the shank, that is while the helical portion 15 is right-handed, the corresponding portion on the other side of the shank is left-handed. A collar 23 is threaded upon the section 11 and is provided with an eye 24. A collar 25 is loosely mounted upon a shank and provided with an eye 25′. A spring 26 is mounted upon the shank 10 between the collars 17 and 16′. This spring normally holds the parts in collapsed position with the arms 19, 19′ and their drawn out portions 21, 21′, facing in the same direction as shown in Fig. 2.

The shank, when in collapsed position as shown in Fig. 2, is suspended between the leaves of a book from the hooks on the support D by means of the wire 13. A wire 38 is passed through the ring 24 and secured to the ring 25′ upon sleeve 25. An upward pull on the wire will draw up the sleeve 25 and raise the sleeves 16, 16′. The pins 16ª in the sleeves will be guided by the helical portion 15, and the arms 19 will be simultaneously moved outwardly and from the positions facing in the same direction shown in Fig. 2 to positions diametrically opposite as shown in Fig. 3. These arms and the drawn out portions will thus operate to turn over a leaf. Ordinarily the weight of the shank portion 10 and the frictional engagement of the spreader with the book will be sufficient to keep the spreader in place. Any suitable means may, however, be provided to additionally restrain the spreader against upward movement. This may be accomplished by making the wires 13 stiff, or by attaching to the shank a hook-shaped wire 28 by means of an eye or the like 27 and passing the hook underneath the book.

Referring to Figs. 5 and 6, 30 designates a base provided with a plurality of hooks 31, and a clamp comprising a head 32, an operating screw 33 and guides 34. The base is provided with an upwardly extending portion 35 which may be of ornamental design as shown, this upwardly extending portion being provided with out-turned lugs 36, between which are mounted pulleys or sheaves 37 upon a shaft 38 passing through the lugs. The support D is clamped upon the frame of a piano by means of the clamp 32. The spreaders are supported from the hooks 31 by the wires 13, and the operating wires 38 hereinafter referred to pass over the pulleys or sheaves 37 and connect with the eyes 25'.

The operating mechanism D Figs. 7, 8, 9 comprises standards 40, 40 provided with attaching lugs 41, 42. The standards are connected by cross pieces 43, 44, provided with apertures forming guides for a plurality of operating bars 45. The operating bars are provided with heads 46 and recesses 47 forming shoulders 48. An operating shaft 49 is mounted in bearings in the standards 40, 40. This operating shaft is provided with a plurality of fingers 50, spaced helically around the shaft as shown in Figs. 7 and 9 and with a ratchet 51 rigidly secured thereto. An arm 52 is loosely mounted upon the shaft 49 and is provided with a pawl 53 pivotally and adjustably mounted in the slot 54 as shown. A link 55 connects the arm 52 with a treadle 56, the pivotal connection 57 between the treadle and the link being an adjustable one as shown in Fig. 8. The treadle is preferably mounted adjacent the piano pedals F, and is mounted upon a pivot pin 58 between ears upon the base 40. The bars 45 are provided with eyes 59 which connect with the operating wires 38.

It will be noted that the fingers 50 are helically mounted upon the shaft 49. These fingers are spaced in the same manner as the teeth upon the ratchet 51, and therefore these fingers 50 will successively contact with the shoulders 48 upon the operating bars 46 to successively depress the bars as the shaft is given a step by step movement. Upon the depression of the treadle the pawl will move the ratchet a distance of one tooth, and therefore the first finger on the right in Fig. 7 will depress its bar. The depression of this bar will, through the agency of the wire 38, connected to the eye 25', raise the sleeve 25 and through it the sleeves 16 and 16', and move the spreader arms from closed position shown in Fig. 2 to open position shown in Figs. 3 and 1. The opening of these arms will turn over a leaf. Upon a second depression of the treadle the second finger from the right in Fig. 7 will come into play and depress the second bar 45, which will through its wire 38 open the second spreader and turn over the second leaf. The friction of the shaft 49 is sufficient to maintain the first bar through its finger 50 in depressed position until the pawl has moved backwardly and engaged the second tooth; but when the pawl moves forward to operate the second bar the first finger will snap over the shoulder 48 and release its bar and so allow the spring 26 to move the arms 19, 19' to collapsed position shown in Fig. 2 before the next spreader is opened. It will thus be seen that by successively depressing the treadle 56 the operating bars 45 are successively operated from right to left. The treadle 56 may be provided with a suitable spring, not shown, for moving it to raised position.

In the operation a number of spreaders are suspended from the hooks 31 and placed in collapsed position between the leaves of the book. By successively depressing the treadle 57 these spreaders are successively opened to turn over the leaves as required. It will thus be seen that this invention provides a very convenient means whereby the leaves of a book may be turned by a foot-operated treadle, leaving the hands entirely free. By drawing out the arms 19, 19' to thin reduced portions 21, 21' the arms will not materially obscure the music or the reading matter.

In the specification and claims the term "book" is used. It is to be understood that this term is to be used as a broad, descriptive term covering any form of book, pamphlet or the like.

It is obvious that various changes may be made in the details of construction without departing from the spirit of this invention, and it is therefore to be understood that this invention is not to be limited to the specific construction shown.

What I claim is:

1. In a leaf turner, the combination with a support, of a plurality of spreaders each comprising relatively movable arms, suspended from the support, and adapted to be placed between the leaves of a book, and means for successively operating the spreaders to separate the arms.

2. In a leaf turner, the combination with a support, of a plurality of spreaders each comprising relatively movable arms, suspended from the support, and adapted to be placed between the leaves of a book, and operating mechanism, including a lever, and a plurality of wires connecting the operating mechanism and the spreaders.

3. In a leaf turner, a spreader including a supporting shank constructed to be placed between the leaves of a book, a plurality of arms mounted upon the shank and arranged to engage opposite faces of adjacent leaves, and means for moving the arms outwardly away from each other.

4. In a leaf turner, a spreader including a supporting shank constructed to be placed between the leaves of a book, a plurality of arms mounted upon the shank and arranged to engage opposite faces of adjacent leaves, and means for moving the arms about a common center away from each other.

5. In a leaf turner, a spreader including a supporting shank constructed to be placed between the leaves of a book, a plurality of arms mounted to move about and outwardly of the shank and arranged to engage opposite faces of adjacent leaves, and means for operating the arms.

6. In a leaf turner, a spreader adapted to engage the leaves of a book and including a supporting shank, a collar mounted upon said shank, means constructed to guide said collar so that a point thereon moves on said shank in a helical curve, an arm secured to said collar, and means for moving said collar longitudinally of said shank, said guiding means being constructed to cause said collar to rotate on said shank when a longitudinal movement is imparted to said collar.

7. In a leaf turner, a spreader adapted to engage the leaves of a book and including a supporting shank, a plurality of arms on said shank, means for supporting one of said arms so as to permit said arm to swing about axes extending in directions at right angles to each other, a collar mounted upon said shank, means constructed to guide said collar so that a point thereon moves on said shank in a helical curve, means connecting said collar to said arm, and means for moving said collar longitudinally of said shank, said guiding means being constructed to cause said collar to rotate on said shank when a longitudinal movement is imparted to said collar.

8. In a leaf turner, a spreader adapted to engage the leaves of a book and including a supporting shank, a plurality of arms mounted on said shank, a plurality of collars connected to said arms, means constructed to guide said collars so that points thereon move on said shank in helical curves, and means for moving said collars longitudinally of said shank, said guiding means being constructed to cause said collars to simultaneously rotate said arms in opposite directions during such longitudinal movements.

9. In a leaf turner, a spreader adapted to engage the leaves of a book and including a supporting shank, a link mounted to swing about the shank, an arm pivoted to the link, a collar mounted upon the shank so that a point on said collar moves on said shank in a helical curve and connected to the arm.

10. In a leaf turner, a spreader adapted to engage the leaves of a book and including a supporting shank, a plurality of links mounted to swing about the shank, a plurality of arms pivoted to the links, and a plurality of collars mounted upon the shank so that points on said collars move on said shank in helical curves and connected to the arms.

11. In a leaf turner, a spreader including a supporting shank constructed to be placed between the leaves of a book, a plurality of arms mounted upon the shank and arranged to engage opposite faces of adjacent leaves, and means for moving the arms outwardly away from each other, said arms being of small thickness so as not to obscure the printed matter etc. on the leaves.

12. In a leaf turner, a spreader adapted to be placed between the leaves of a book and including a supporting shank, and a pair of arms mounted to move about the shank from a position facing in the same direction to a position diametrically opposite.

13. In a leaf turner, a spreader adapted to be placed between the leaves of a book and including a supporting shank, a pair of arms mounted to move about the shank from a position facing in the same direction to a position diametrically opposite, and a spring to move the arms to the first position.

14. In a leaf turner, a spreader adapted to be placed between the leaves of a book and including a supporting shank, a pair of arms mounted to move about the shank from a position facing in the same direction to a position diametrically opposite, a spring to move the arms to the first position, and cam means to move them to the second position.

15. In a leaf turner, a spreader adapted to be placed between the leaves of a book and including a supporting shank, a pair of arms mounted to move about the shank from a position facing in the same direction to a position diametrically opposite and outwardly, a spring to move the arms to the first position, and cam means to move them to the second position.

16. In a leaf turner, the combination with a spreader, of operating mechanism therefor including, an operating bar provided with a shoulder, a movable shaft provided with a finger adapted to engage the shoulder, means to move the shaft, and a wire connecting said bar and said spreader.

17. In a leaf turner, the combination with spreaders, of operating mechanism therefor including, a plurality of sliding operating bars provided with shoulders, an operating shaft provided with fingers one for each bar, means for successively moving the fingers into engagement with the shoulders, and means operatively connecting said bars and spreaders.

18. In a leaf turner, the combination with spreaders, of operating mechanism therefor including, a plurality of sliding operating bars provided with shoulders, an operating shaft provided with fingers coöperating with the shoulders and spaced helically around the shaft, means for operating the shaft with a step by step movement, and means operatively connecting said bars and spreaders.

19. In a leaf turner, the combination with a spreader, of operating mechanism therefor including, an operating bar provided with a shoulder, a movable shaft provided with a finger adapted to engage the shoulder to move the bar and then move out of engagement with the same, means to move the shaft, and means operatively connecting said bar and spreader.

20. In a leaf turner, in combination, a plurality of spreaders adapted to be placed between the leaves of a book, an operating lever, and wires operatively connecting the spreaders and the operating lever.

21. In a leaf turner, in combination, a plurality of spreaders adapted to be placed between the leaves of a book, a plurality of bars, wires operatively connecting the bars and the spreaders, and means for successively operating the bars.

22. In a leaf turner, in combination, a plurality of spreaders adapted to be placed between the leaves of a book, a plurality of bars provided with shoulders, a connection between the spreaders and bars, an operating shaft provided with fingers one for each bar, and means to operatively move the fingers into contact with the shoulders, to move the bars and operate the spreaders.

23. In a leaf turner having spreaders and operating means, a support comprising a body portion provided with a plurality of hooks adapted to support the spreaders, a plurality of guides for the operating means, and means for clamping said support in position.

SELMA ELIAS BERLINER.

Witnesses:
J. M. BENNETT, Jr.,
A. L. C. MAGRUDER.